US011477270B1

(12) United States Patent
Manoharan et al.

(10) Patent No.: US 11,477,270 B1
(45) Date of Patent: Oct. 18, 2022

(54) SEAMLESS HAND-OFF OF DATA TRAFFIC IN PUBLIC CLOUD ENVIRONMENTS

(71) Applicant: VMware, Inc., Palo Alto, CA (US)

(72) Inventors: Harish Manoharan, San Jose, CA (US); Subin Cyriac Mathew, San Jose, CA (US); Dileep Devireddy, San Jose, CA (US); Sreenivas Duvvuri, San Jose, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/368,729

(22) Filed: Jul. 6, 2021

(51) Int. Cl.
*H04L 67/1001* (2022.01)
*H04L 45/586* (2022.01)
*H04L 45/74* (2022.01)
*H04L 45/02* (2022.01)

(52) U.S. Cl.
CPC .......... *H04L 67/1001* (2022.05); *H04L 45/02* (2013.01); *H04L 45/586* (2013.01); *H04L 45/74* (2013.01)

(58) Field of Classification Search
CPC ... H04L 67/1001; H04L 45/02; H04L 45/586; H04L 45/74
See application file for complete search history.

(56) References Cited

U.S. PATENT DOCUMENTS

| 8,429,647 | B2* | 4/2013 | Zhou | G06F 9/4856 |
| | | | | 718/1 |
| 9,417,812 | B1* | 8/2016 | Palekar | G06F 3/0689 |
| 9,525,647 | B2* | 12/2016 | Koponen | H04L 47/50 |
| 10,205,648 | B1* | 2/2019 | Guo | H04L 43/12 |
| 10,228,959 | B1* | 3/2019 | Anderson | G06F 9/4856 |
| 10,826,723 | B1* | 11/2020 | Strauss | G06F 9/45558 |
| 2004/0001508 | A1* | 1/2004 | Zheng | H04L 12/4633 |
| | | | | 370/466 |
| 2008/0259873 | A1* | 10/2008 | Ahmavaara | H04W 36/0033 |
| | | | | 370/331 |

(Continued)

OTHER PUBLICATIONS

Wang, Yi, et al. "Virtual routers on the move: live router migration as a network-management primitive." ACM SIGCOMM Computer Communication Review 38.4 (2008): 231-242.*

(Continued)

*Primary Examiner* — Jimmy H Tran
(74) *Attorney, Agent, or Firm* — Patterson & Sheridan, LLP

(57) ABSTRACT

The disclosure provides an approach for seamless hand-off of data traffic in public cloud environments. Techniques are provided for activating an edge services gateway (ESG) virtual computing instance (VCI) on a new host. Prior to activating the ESG VCI on the new host, an underlay routing table is reprogrammed to associate a first IP address of a first tunnel endpoint (TEP) with a first network interface of an old host and to associate a second IP address of a second TEP with a second network interface of the new host. The routing table associates a third IP address of the ESG VCI with the first network interface. After activating the ESG VCI, a packet having as a destination address the third IP address is received at the first network interface and is encapsulated, by the first TEP, with an outer header having as a destination address the second IP address.

20 Claims, 5 Drawing Sheets

(56) References Cited

U.S. PATENT DOCUMENTS

| | | | | |
|---|---|---|---|---|
| 2010/0287548 | A1* | 11/2010 | Zhou | G06F 9/4856 718/1 |
| 2010/0322255 | A1* | 12/2010 | Hao | H04L 49/70 370/398 |
| 2012/0311568 | A1* | 12/2012 | Jansen | G06F 9/45558 718/1 |
| 2013/0198355 | A1* | 8/2013 | Kalyanaraman | G06F 9/4856 709/223 |
| 2015/0010012 | A1* | 1/2015 | Koponen | H04L 41/0895 370/411 |
| 2015/0227325 | A1* | 8/2015 | Rupanagunta | G06F 3/0607 710/16 |
| 2018/0131568 | A1* | 5/2018 | Manickam | G06F 9/4856 |
| 2019/0028300 | A1* | 1/2019 | Mathew | H04L 45/74 |
| 2019/0036868 | A1* | 1/2019 | Chandrashekhar | H04L 45/021 |
| 2020/0014558 | A1* | 1/2020 | Koponen | H04L 41/0893 |
| 2020/0045148 | A1* | 2/2020 | Mishra | H04L 69/22 |
| 2020/0053125 | A1* | 2/2020 | Ngo | H04L 12/4633 |
| 2020/0067847 | A1* | 2/2020 | Thakkar | H04L 41/20 |
| 2020/0092161 | A1* | 3/2020 | Dubey | H04L 41/0663 |
| 2020/0159556 | A1* | 5/2020 | Chandrappa | G06F 9/54 |
| 2020/0186447 | A1* | 6/2020 | Song | H04L 43/02 |
| 2020/0236041 | A1* | 7/2020 | Yu | H04L 49/70 |
| 2021/0036891 | A1* | 2/2021 | Babbar | G06F 9/45545 |
| 2021/0073017 | A1* | 3/2021 | Lolage | H04L 61/5061 |
| 2021/0119897 | A1* | 4/2021 | Chen | H04L 43/20 |
| 2021/0184898 | A1* | 6/2021 | Koponen | H04L 41/122 |
| 2021/0191750 | A1* | 6/2021 | Zhang | H04L 41/08 |
| 2021/0258219 | A1* | 8/2021 | Kumarasamy | H04L 41/0846 |
| 2021/0311772 | A1* | 10/2021 | Mishra | H04L 47/17 |
| 2021/0314228 | A1* | 10/2021 | Chandrashekhar | G06F 9/546 |
| 2022/0086106 | A1* | 3/2022 | Lambeth | G06F 9/45558 |
| 2022/0131746 | A1* | 4/2022 | Garg | H04L 41/0897 |
| 2022/0141155 | A1* | 5/2022 | Zhang | H04L 49/3063 370/216 |

OTHER PUBLICATIONS

Wood, Timothy, et al. "CloudNet: dynamic pooling of cloud resources by live WAN migration of virtual machines." ACM Sigplan Notices 46.7 (2011): 121-132.*

Gupta, Arpit, et al. "Sdx: A software defined internet exchange." ACM SIGCOMM Computer Communication Review 44.4 (2014): 551-562.*

U.S. Appl. No. 16/993,807, filed Aug. 14, 2020.

U.S. Appl. No. 16/893,170, filed Jun. 4, 2020.

* cited by examiner

SEAMLESS HAND-OFF OF DATA TRAFFIC IN PUBLIC CLOUD ENVIRONMENTS

BACKGROUND

Software defined networking (SDN) may be used to create a software defined datacenter (SDDC). An SDDC involves a plurality of hosts in communication over a physical network infrastructure of a data center (e.g., on-premise data center or a cloud data center). Each host has one or more virtualized endpoints such as virtual machines (VMs), containers, or other virtual computing instances (VCIs). These VCIs may be connected across the multiple hosts in a manner that is decoupled from the underlying physical network infrastructure. The VCIs may be connected to logical overlay networks that may span multiple hosts. The underlying physical network and the logical overlay network may use different addressing.

SDN involves the use of a management plane (MP) and a control plane (CP). The management plane is responsible for receiving network configuration input from, for example, an administrator and generating desired state data that specifies how the logical network should be implemented in the physical infrastructure. The control plane is responsible for determining the logical overlay network topology and maintaining information about network entities such as logical switches, logical routers, endpoints, etc. The logical topology information is translated by the control plane into network configuration data that is then communicated to network elements of each host. The network configuration data, for example, includes forwarding table entries to populate forwarding tables at virtual switch(es) provided by the hypervisor (i.e., virtualization software) deployed on each host. An example control plane logical network controller is described in U.S. Pat. No. 9,525,647 entitled "Network Control Apparatus and Method for Creating and Modifying Logical Switching Elements," which is fully incorporated herein by reference.

Network virtualization makes it possible to programmatically create, provision, and manage networks all in software, using the underlying physical network as a simple packet-forwarding backplane. Network virtualization makes use of overlay technologies, which sit above the physical network hardware and work with the server hypervisor layer. Network and security services in software are distributed to hypervisors and "attached" to individual VMs in accordance with networking and security policies defined for each connected application.

In a cloud data center, a cloud provider may offer network layer, such as Layer 3 (L3) connectivity via a physical network, which may be referred to as an underlay network. Hosts may be connected via the underlay network, which may route packets for workloads running on the hosts. Internet Protocol (IP) addresses for network interfaces associated with hosts and even some VMs addressable on the underlay itself may be programmed in an underlay routing table in the underlay network. Routers in the underlay use the routing table to route packets to a next hop.

Any arbitrary set of VMs in a datacenter may be placed in communication across a logical Layer 2 network by connecting them to a logical switch. Each logical switch corresponds to a virtual network identifier (VNI). A logical switch is collectively implemented by at least one virtual switch on each host that has a VM connected to the logical switch. The virtual switch on each host operates as a managed edge switch implemented in software by the hypervisor on each host.

When VMs communicate with each other over the overlay network, a packet is encapsulated, by a source virtual tunnel endpoint (VTEP) associated with the source VM, with destination address information of a destination VTEP associated with the destination VM. Such VMs that are part of the overlay network may be referred to as overlay VMs, compute VMs, or workload VMs. The source VTEP may operate on a source host that hosts the source VM, and the destination VTEP may operate on a destination host that hosts the destination VM. Accordingly, the packet is communicated between the source VTEP on the source host and the destination VTEP on the destination host via a physical underlay network. Forwarding tables at a virtual switch on the source host instruct the source VTEP to encapsulate packets received from a source VM.

The original packet, also referred to as an inner packet having an inner header after encapsulation, may include a source address of the source VM, and a destination IP address of a destination VM, the source VM and destination VM having IP addresses addressable in the overlay network. The original packet from the source VM is encapsulated at the source VTEP with an outer header to include an outer destination IP address addressed to the destination host/VTEP using a mapping of VM IP addresses to host/VTEP IP addresses. The outer header further includes a source IP address of the source VTEP. The source VTEP and destination VTEP have IP addresses addressable in the physical underlay network. The physical network delivers the encapsulated packet to the destination host. A destination VTEP at the destination host can decapsulate the packet, remove the outer header, and then the local virtual switch delivers the original packet to the destination VM. Logical routers may extend the logical network across subnets or other network boundaries using IP routing in the logical domain. Logical routers may be implemented as virtual routers (e.g., a virtual distributed router (VDR)) on the host machines.

A VTEP may be associated with software components, or it may itself, provide Layer 2 tunneling services for encapsulating egress packets from VMs and decapsulating ingress packets to implement a logical overlay network to interconnect VMs running on different hosts as part of the same layer 2 logical overlay network, meaning as part of the same logical layer-2 network/broadcast domain in the logical overlay network. Tunneling services may be implemented using tunneling protocols such as virtual extensible local area network (VXLAN), Stateless Transport Tunneling (STT), Generic Network Virtualization Encapsulation (GENEVE), Multiprotcol Label Switching (MPLS), or Generic Routing Encapsulation (GRE).

VTEP services may be implemented at each host (hypervisor-based VTEP) or at a gateway (e.g., a gateway VM VTEP). VTEPs are generally connected to virtual switches implemented by the hypervisor for virtual machines on the same physical host. Hardware VTEPs are often integrated into top-of-rack (TOR) switches, but could be provided as a stand-alone appliance for bridging logical overlay networks with physical networks.

A virtual local area network (VLAN) is a broadcast domain that is partitioned and isolated at Layer 2. Accordingly, VLANs can be used to segment a layer 2 network to separate traffic between different VLANs. For example, different VMs may be assigned different VLAN IDs corresponding to different VLANs.

In an SDDC, an edge services gateway (ESG) provides routing services and connectivity to networks that are external to the overlay. The ESG may be implemented as a VM on a host, and referred to as an ESG VM. Packets sent by overlay VMs within the SDDC and destined for an external network are encapsulated and sent to the ESG VM using VTEPs as discussed. The ESG VM strips off the headers and performs routing to the external network. The ESG VM may be directly addressable on the underlay network, meaning it has an IP address addressable on the underlay network and included in the underlay routing table.

An ESG VM may be deployed as an active/standby pair for high availability. High availability (HA) ensures that the services provided by the ESG VM are available even when a hardware or software failure renders an ESG VM unavailable. A primary ESG VM is in the active state and a secondary ESG VM is in the standby state. All ESG services run on the active ESG VM. The primary ESG VM and the secondary ESG VM are located on different hosts. In alternate embodiments, HA ESG services can be provided across multiple active ESGs.

In some scenarios, an active ESG VM moves to a different host or a standby ESG VM is activated on a different host. The ESG VM may be moved or activated on a different host in planned and unplanned scenarios. In a planned scenario, the active ESG VM is moved to a different host due to a planned migration of the ESG VM. This migration can be a "live migration" without a significant period of time between deactivation of the ESG VM on the source host and activation of the ESG VM on the destination host. For example, the ESG VM may be migrated to a different host for maintenance on the source host, due to a distributed resource scheduler (DRS) scheduler decision (e.g., such as for load balancing), or other planned migration. In another planned scenario, the standby ESG VM is activated on another host for a planned upgrade of the ESG VM. In this case, the active ESG VM is put in a maintenance mode and the standby ESG VM is activated on the new host. In an unplanned scenario, the active ESG VM experiences a failure, such as due to a hardware failure. The standby ESG VM can detect failure of the ESG VM using bilateral forwarding detection (BFD) communication. The primary ESG VM transmits a heartbeat (e.g., a keep alive message) to the standby ESG VM, and additionally sends service state updates through an internal interface. If a heartbeat is not received from the primary ESG VM within a specified time, the ESG VM is declared failed. The standby ESG VM moves to the active state, takes over the interface configuration of the primary ESG VM, and starts the ESG services that were running on the primary ESG VM.

When the active ESG VM is handed-off, such as when the active ESG VM moves from one host to another host, or when the standby ESG VM is activated on another host, the hand-off may not be seamless. For example, there may be data traffic (e.g., north-south data traffic) downtime. The term, "data traffic downtime" in this context refers to the period of time after hand-off of an active ESG VM during which the ESG VM fails to receive packets directed to it until traffic is restored on the new host. This period of data traffic downtime after hand-off is variable and depends on the scenario causing the active ESG VM to move hosts. The data traffic downtime may be around 10 seconds to more than 40 seconds. During planned upgrades, this data traffic downtime problem is exacerbated as the active ESG VM might be moved twice during the upgrade phase and both times traffic will be impacted.

The data traffic downtime due to hand-off includes (1) a time taken to detect that the primary ESG VM has moved to the new host, been activated on the new host, or has failed; (2) a time taken for convergence at the ESG VM, including a time to notify a cloud manager of the move; (3) a time for virtual router of the overlay network routing table programming and underlay router routing table programming; and (4) a time for convergence at the underlay. The cloud manager is a process running on a host hypervisor. The cloud manager may be responsible for the programming of the overlay. The cloud manager establishes channels, programs virtual routers on the host, and programs the underlay.

For virtual router programming of the overlay and underlay router programming for both the planned and unplanned scenarios, once the cloud manager on the new host detects that the ESG VM has moved to the new host, the cloud manager begins programming the overlay and underlay routes to point to the new host with the active ESG VM. For example, when the ESG VM moves to the new host, the IP address of the ESG VM does not change and, therefore, the underlay route table entries for the ESG VM IP address are reprogrammed to point to a network interface (NI) on the new host as a next hop destination for the ESG VM IP address. The overlay and underlay routes are reprogrammed for the public and private IP addresses of the ESG VM.

Network interfaces provided by a cloud environment may be referred to as host network interfaces (HNIs). Such HNIs may be software defined network interfaces. One or more IP addresses that are addressable on the underlay may be bound to an HNI, such that routers of the underlay are configured to route packets addressed to such IP addresses to the HNI. The HNI may be implemented on a particular host, and therefore the routers of the underlay are configured to route packets addressed to such IP addresses of the HNI to the associated host. For example, when the ESG VM moves from an old host implementing an old HNI to a new host implementing a new HNI, the underlay routing table is updated to change the association of the ESG VM IP address from the old HNI to the new HNI. A host may have multiple HNIs. The ESG VM may be bound to a different HNI than a VTEP of the host. A packet directed to the ESG VM may be routed to a different HNI at the host than a packet directed to the host VTEP.

The programming of the routes may use an application programming interface (API) call to a cloud server that manages the underlay for each route (e.g., each API call may take on the order of seconds). For example, a public cloud provider provides access to the cloud server that exposes an API that is used by hosts in the system to program routes in the underlay route table. The API is subject to rate-limits and the cloud manager retries programming until it succeeds. For example, the cloud server may have threshold limits that restrict the number of routes that can be programmed in the underlay route table in a table period. If a large number of routes are being programmed at once, this may result in delays or failures for requests to program the routes. Further, the underlay does not converge immediately on the new HNI once a route entry for an IP address is changed to the new HNI (e.g., the underlay convergence may be on the order of seconds).

Traffic restores more quickly on the overlay than on the underlay due to the underlay programming and convergence time required. The underlay programming and convergence time may be non-deterministic as underlay API programming can be delayed due to a number of reasons. Thus, the underlay will continue to send traffic to the old HNI on the old host until it converges on the new HNI on the new host.

SUMMARY

The technology described herein provides a method for seamless hand-off of data traffic in public cloud environments. Embodiments include a method of activating an edge services gateway (ESG) virtual computing instance (VCI) on a new host. The method generally includes, prior to activating the ESG VCI on the new host, programming a routing table of an underlay network to associate a first IP address of a first tunnel endpoint with a first network interface and to associate a second IP address of a second tunnel endpoint with a second network interface. The first network interface is associated with an old host and the second network interface is associated with the new host and the routing table associates a third IP address of the ESG VCI with the first network interface. The method further includes, after activating the ESG VCI on the new host, initiating reprogramming of the routing table to associate the third IP address with the second network interface instead of the first network interface. The method further includes, after initiating the reprogramming, receiving, at the first network interface, a packet having as a destination address the third IP address. The method further includes, encapsulating, by the first tunnel endpoint, the packet with an outer header having as a destination address the second IP address. The method further includes, transmitting, via the underlay network, the encapsulated packet to the second tunnel endpoint. The underlay network routes the encapsulated packet from the first network interface to the second network interface based on the routing table associating the second IP address with the second network interface. The method further includes, decapsulating, by the second tunnel endpoint, the encapsulated packet. The method further includes forwarding the packet on the new host to the ESG VCI.

Further embodiments include a non-transitory computer-readable storage medium storing instructions that, when executed by a computer system, cause the computer system to perform the method set forth above, and a computer system including at least one processor and memory configured to carry out the method set forth above.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure provides an approach for seamless hand-off of data traffic in public cloud environments. Configuring a host computer ("host") with an SDN software suite or solution in a data center, such as a public cloud data center, involves deploying a virtual switch on the host, where the virtual switch is configured to handle/forward logical overlay networking traffic ("overlay traffic") corresponding to data communicated on the logical overlay networks that one or more VMs executing on the host may be a part of. The virtual switch may also be configured to handle other types of traffic, such as traffic of a gateway device that may be implemented as a VCI on the host (e.g., an ESG VM). A virtual switch may implement one or more logical switches or forwarding tables.

In some embodiments, a cloud manager on a host establishes a control tunnel between the cloud manager and cloud managers of multiple other hosts. The cloud manager on the host also establishes data tunnels between virtual routers on the host and virtual routers on the multiple other hosts. When an active ESG VM is moved to a different host or when a standby ESG VM is activated on a different host, the cloud manager on the new host can broadcast a message to the other hosts, via the pre-established control tunnels, to provide information on the location of the ESG VM active on the new host. The cloud manager on the old host, in response to this message, programs the virtual routers of the old host to forward packets received from the underlay for the ESG VM to the new host, using the data tunnels pre-established between the virtual routers. The cloud manager on the new host programs the new host virtual routers to expect such forwarded packets on the data tunnels.

Rerouting packets through the control tunnels in this manner provides seamless hand-off of data traffic and may reduce data traffic downtime due to underlay programming and convergence. By routing the traffic from the old host to the new host using the pre-established data tunnels, overlay convergence time is decoupled from underlay convergence time, providing a reliable convergence time for the overlay even when the underlay takes a longer time to converge.

Figure 1:
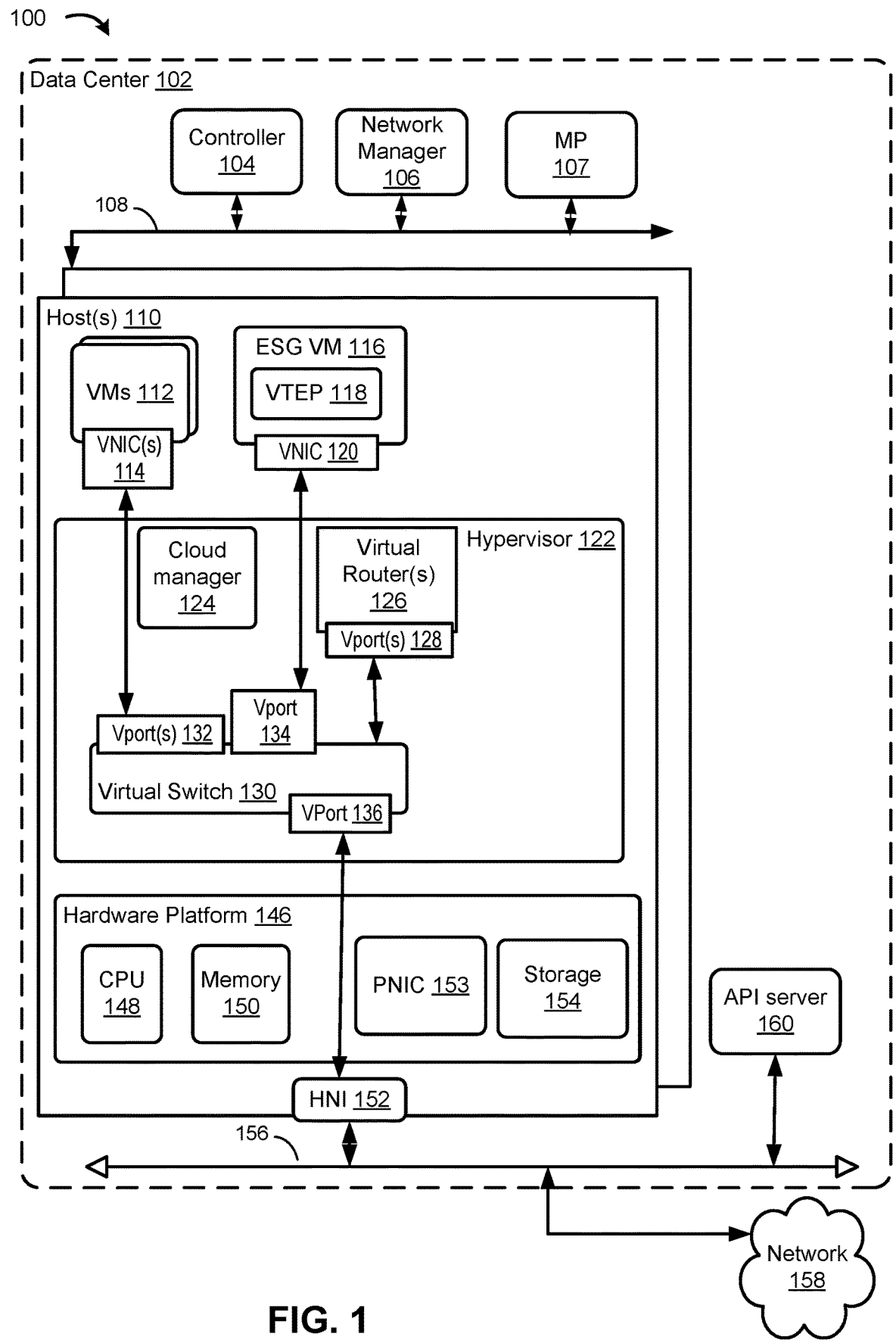
FIG. 1 depicts a block diagram of a host having an active ESG VM, according to one or more embodiments.

FIG. 1 depicts example physical and virtual network components in a network environment 100 in which embodiments of the present disclosure may be implemented. In some implementations, networking environment 100 might be a public cloud environment. Networking environment 100 includes a set of networked computing entities, and may implement a logical overlay network. As shown, networking environment 100 includes data center 102 and external network 158, which may be a wide area network such as the Internet.

Data center 102 is an SDDC. Data center 102 includes hosts 110, a management network 108, a data network 156, a controller 104, a network manager 106, and a management plane 107. Data network 156 and management network 108 may be implemented as separate physical networks or separate VLANs on the same physical network. Data center 102 includes a management plane (MP) and a control plane. The management plane and control plane each may be implemented as single entities (e.g., applications running on a physical or virtual compute instance), or as distributed or clustered applications or components. In alternative embodiments, a combined manager/controller application, server cluster, or distributed application, may implement both management and control functions. In the embodiment shown, MP 107 at least in part implements the management plane and controller 104 at least in part implements the control plane.

MP 107 receives network configuration input from an administrator and generates desired state data that specifies how a logical network should be implemented in the physical infrastructure of data center 102.

Network manager 106 may communicate with host(s) 110 via management network 108. Network manager 106 may be a computer program or a plurality of programs that executes in one or more central servers in networking environment 100, or alternatively, network manager 106 may run in one or more VMs (e.g., in host(s) 110). Network manager 106, as described herein, may carry out administrative tasks for networking environment 100, including managing host(s) 110, VCIs running within hosts, provisioning VCIs, transferring VCIs from one host to another host, transferring VCIs from networking environment 100 to another network or data center (not shown), and load balancing between hosts in networking environment 100 or in other networks.

The control plane determines the logical overlay network topology and maintains information about network entities such as logical switches, logical routers, and endpoints, etc. The logical topology information is translated by the control plane into network configuration data that is then communicated to network elements of host(s) 110. Controller 104 may be one of multiple controllers executing on various hosts in data center 102 that together implement the functions of the control plane in a distributed manner. Controller 104 collects and distributes information about the network from and to endpoints in the network. Controller 104 communicates with host(s) 110 via management network 108, such as through control plane protocols.

Host(s) 110 may be communicatively connected to data network 156, which is also referred to as a physical or "underlay" network. As used herein, the term "underlay" is synonymous with "physical" and refers to physical components of networking environment 100. As used herein, the term "overlay" is used synonymously with "logical" and refers to the logical network implemented at least partially within networking environment 100. In some implementations, the underlay is a public cloud network, which itself may include an indirection layer but for the purpose of this description, is treated as a physical network underlay.

Host(s) 110 in data center 102 may be geographically co-located servers on the same rack or on different racks in any arbitrary location in data center 102. Host(s) 110 are configured to provide a virtualization layer, also referred to as a hypervisor 122, that abstracts processor, memory, storage, and networking resources of hardware platform 146 into multiple virtual machines, VM(s) 112.

The hypervisor architecture may vary. Virtualization software can be installed as system level software directly on the server hardware (often referred to as "bare metal" installation) and be conceptually interposed between the physical hardware and the guest operating systems executing in the virtual machines. Alternatively, the virtualization software may conceptually run "on top of" a conventional host operating system in the server. In some implementations, hypervisor 122 may comprise system level software as well as a "Domain 0" or "Root Partition" virtual machine (not shown) which is a privileged machine that has access to the physical hardware resources of the host. In this implementation, one or more of a virtual switch, virtual router, virtual tunnel endpoint (VTEP), etc., along with hardware drivers, may reside in the privileged virtual machine. Although parts of the disclosure are described with reference to VMs, the teachings herein also apply to other types of VCIs, such as containers, Docker containers, data compute nodes, isolated user space instances, namespace containers, and the like.

Host 110 may be constructed on a server grade hardware platform 146, such as an x86 architecture platform. Hardware platform 146 of host 110 may include components of a computing device such as one or more processors (CPUs) 148, system memory 150, one or more network interfaces (PNIC 153, HNI 152), storage system 154, and other components (not shown). CPU 148 is configured to execute instructions, for example, executable instructions that perform one or more operations described herein and that may be stored in memory 150 and in storage system 154. Network interface(s) 152 and 153 enable host 110 to communicate with other devices via a physical network, such as the management network 108, data network 156, and/or network 158.

Host network interface (HNI) 152 may be software defined network interfaces provided by the cloud provider and addressable on the underlay network. HNI 152 is bound to an IP address of the underlay for routing to a packet destination. Different HNIs may each be associated with a different VLAN. Each HNI may be associated with an entry in a routing table for the underlay. An HNI of a host may be coupled to a logical switch implemented by a virtual switch running on the host. An HNI may be bound to multiple IP addresses.

Host 110 includes ESG VM 116. ESG VM 116 is configured to operate as a gateway device that provides VMs 112 on host(s) 110 with connectivity to an external network, such as network 158. Network 158 may be a layer 3 (L3) physical network. Network 158 may be a public network, a wide area network (WAN) such as the Internet, a direct link, a local area network (LAN), another type of network, or a combination of these.

ESG VM 116 is addressable using addressing of the physical underlay network (e.g., data network 156). ESG VM 116 manages external public IP addresses and route traffic incoming to and outgoing from data center 102. ESG VM 116 may also provide other networking services, such as firewalls, network address translation (NAT), dynamic host configuration protocol (DHCP), and load balancing. Such services may be provided by service VMs (not shown). ESG VM 116 includes a VTEP 118 for encapsulating/decapsulating packets.

Hypervisor 122 of host 110 includes a virtual switch 130, a VTEP 138, virtual router(s) 126, and a cloud manager 124. Cloud manager 124 is a process running on hypervisor 122. Cloud manager 124 programs routes using an API call to API server 160 that manages the underlay for each route.

Virtual switch 130 serves as a software-based interface between HNI(s) 152 and VMs 112/116 running on host 110. Virtual switch 130 may be a VDS. A VDS functions as a single virtual switch managed across multiple hosts 110. Virtual router(s) 126 route traffic for a respective host 110, such as between ESG VM 116 and other VMs 112 on host 110.

Each of VMs 112 and ESG VM 116, running on host 110 may include a virtual network interface card (VNIC), such as VNIC(s) 114 of VMs 112 and VNIC 120 of ESG VM 116, which is responsible for exchanging packets between VM 112 and hypervisor 122. VNICs may be, in some cases, a software abstraction of a NIC (i.e., physical NIC). Further, each of VMs 112 is connected to a virtual port (vport) provided by virtual switch 130. For example, ESG VM 116 connects to virtual port 134 of virtual switch 130 via VNIC 120 and VMs 112 connect to virtual port(s) 132 of virtual switch 130 via VNIC(s) 114. Virtual switch 130 connects to HNI 152 via virtual port 136.

Figure 1A:
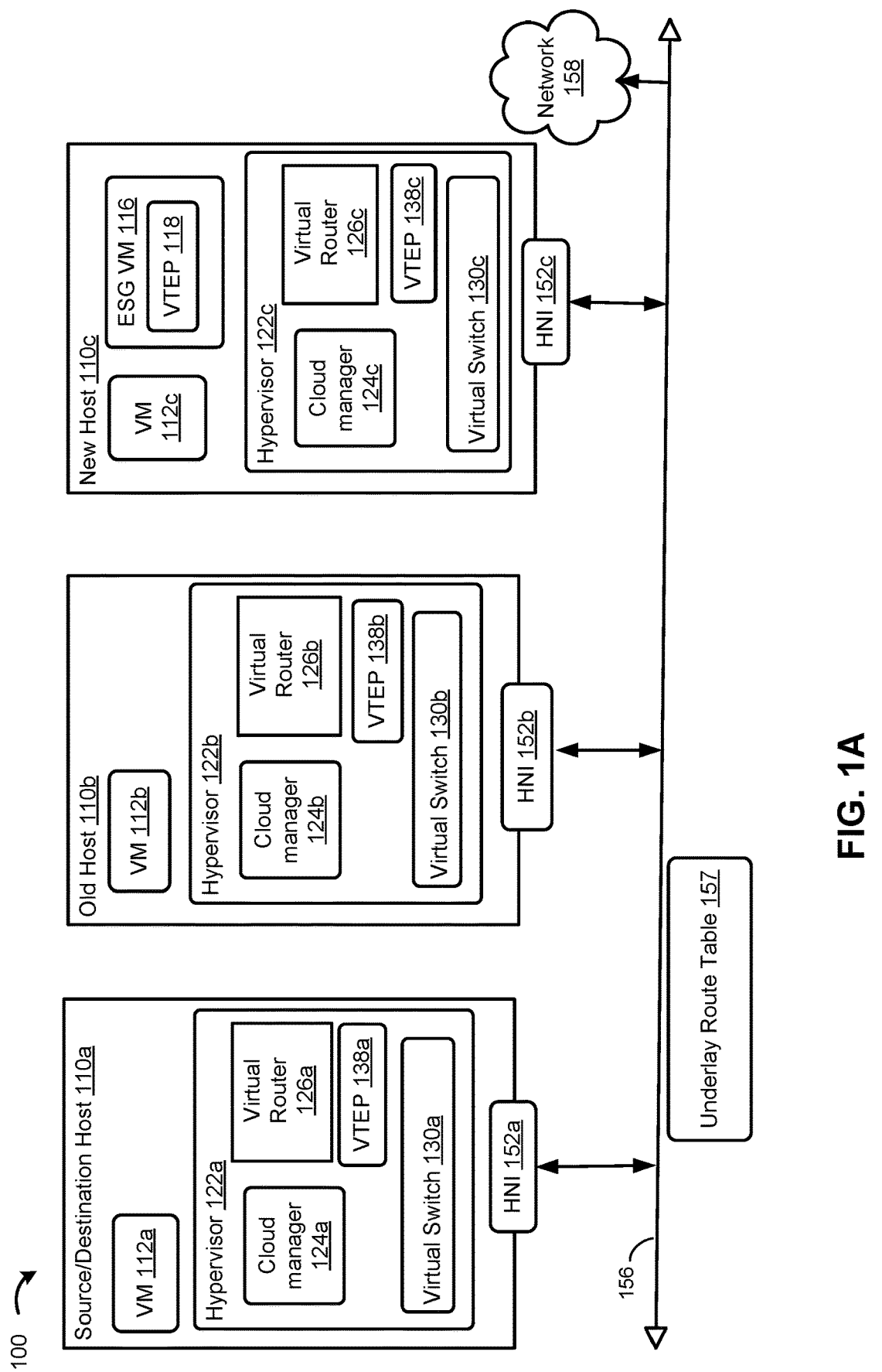
FIG. 1A depicts a block diagram of a packet source host, an old ESG VM host, and a new ESG VM host having an active ESG VM, according to one or more embodiments.

According to certain embodiments, when ESG VM 116 moves to a different host or when a standby ESG VM 116 is activated on a different host, host 110 tunnels traffic to the different host while the underlay is programmed and converges. FIG. 1A depicts a block diagram of a packet source/destination host 110a, an old host 110b, and a new host 110c having active ESG VM 116, according to one or more embodiments. Old host 110b is a host 110 on which ESG VM 116 was previously running before moving to or activating on new host 110c. In examples described herein, source/destination host 110a is a source host 110a for outbound traffic and source/destination host 110a is destination host 110a for inbound traffic.

Figure 2:
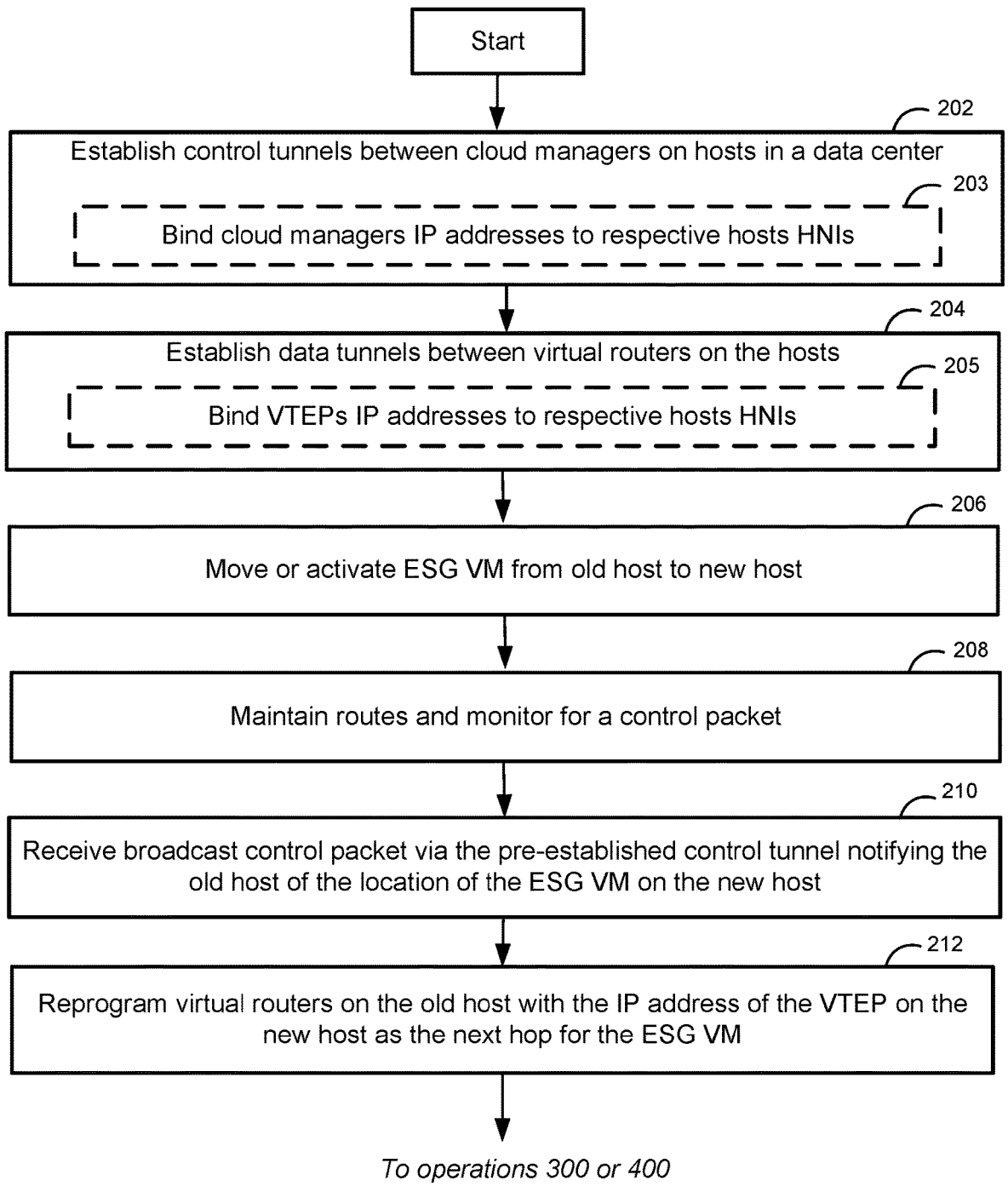
FIG. 2 depicts a flowchart of example operations for seamless hand-off of data traffic in a public cloud environment, according to one or more embodiments.

FIG. 2 depicts a flowchart of example operations 200 for seamless hand-off of data traffic in a public cloud environment, according to one or more embodiments. FIG. 2 may be understood with reference to FIG. 1A. Operations 200 provide for creation of a common overlay network that can be used for tunneling control and data packets. Operations 200 also provide for notification and programming of virtual router(s) on an old host to use the data tunnels for forwarding packets for an ESG VM to a new host.

At block 202, operations 200 include establishing control tunnels between cloud managers on hosts in the data center. Cloud managers 124a, 124b, and 124c on hosts 110a, 110b, and 110c, respectively, pre-create control tunnels between cloud managers 124a, 124b, and 124c. To establish the control tunnels, at block 203, cloud managers 124a, 124b, and 124c can bind the IP addresses for cloud managers 124a, 124b, and 124c to HNIs 152a, 152b, and 152c, respectively. Cloud managers 124a, 124b, and 124c may perform API calls to API server 160 to program underlay route table 157 to map the addresses for cloud managers 124a, 124b, and 124c to HNIs 152a, 152b, and 152c, respectively.

At block 204, operations 200 include establishing data tunnels between virtual routers on the hosts. Cloud managers 124a, 124b, and 124c can pre-create data tunnels between VTEPs 138a, 138b, and 138c associated with virtual router(s) 126a, 126b, and 126c on hosts 110a, 110b, and 110c, respectively. To establish the data tunnels, at block 205, cloud managers 124a, 124b, and 124c can program routes to bind the IP addresses of VTEPs 138a, 138b, and 138c to HNIs 152a, 152b, and 152c, respectively. Cloud managers 124a, 124b, and 124c may perform API calls to API server 160 to program underlay route table 157 to map the addresses for VTEPs 138a, 138b, and 138c to HNIs 152a, 152b, and 152c, respectively.

In some cases, a given host 110 may be configured to handle different classes of traffic separately. For example, the different traffic classes may be communicated on different subnets. A host 110 may have separate HNIs, or HNIs logically implemented by a single HNI, for different traffic classes. For each class of traffic, a host 110 may implement a separate virtual router 126, and further have a different IP address assigned for the VTEP 138. For example, a first IP address may be used by VTEP 138 on a host 110 for a first class of traffic, and a second IP address may be used by VTEP 138 on the host 110 for a second class of traffic. Accordingly, each of the IP addresses of the VTEP 138 on the host 110 may be bound to the HNI 152 of the host 110, thereby creating multiple different data overlay tunnels to support the multiple different traffic classes between hosts.

At block 206, operations 200 include moving an ESG VM from an old to a new host or activating the ESG VM on the new host. For example, ESG VM 116 is moved from old host 110b to new host 110c, or ESG VM 116 is deactivated or failed on old host 110b and a standby ESG VM is activated on new host 110c. ESG VM 116 may be migrated from old host 110b to new host 110c. ESG VM 116 may be put into a maintenance mode on old host 110b and a standby ESG VM 116 is activated on new host 110c. ESG VM 116 may have failed on old host 110b and standby ESG VM 116 is activated on new host 110c. In some embodiments, multiple ESG VMs may be active and one of the ESG VMs moves or is activated on a different host.

In some embodiments, old host 110b is configured to wait for a period of time for a control packet before deleting its routes for ESG VM 116 when ESG VM 116 is moved or inactive. At 208, operations 200 may include maintaining routes and monitoring for a control packet. Cloud manager 124b does not immediately delete the routes to ESG VM 116 at virtual router(s) 126b when ESG VM 116 moves to new host 110c or becomes inactive on new host 110c. Instead, old host 110b holds for a duration (e.g., around 30 seconds) and monitors for a broadcast packet from cloud manager 124c. If the broadcast packet is not received for the duration, then old host 110b deletes the routes to ESG VM 116 (not shown in FIG. 2).

At block 210, operations 200 include receiving a broadcast control packet via the pre-established control tunnel notifying the old host of the location of the active ESG VM on the new host. For example, once cloud manager 124c is notified that ESG VM 116 is active on new host 110c, cloud manager 124c sends a broadcast packet via the pre-created control tunnel to cloud manager 124b to notify cloud manager 124c that ESG VM 116 is active on new host 110c. In some embodiments, the packet has a source IP address, addressable on the underlay, of cloud manager 124c and a destination IP address addressable on the underlay of a broadcast domain that includes cloud manager 124b, or an IP address of cloud manager 124b itself. Cloud manager 124c sends the packet to virtual switch 130c, which based on the destination address being outside of new host 110c, forwards the packet to the underlay via HNI 152c. The underlay, having the IP address of cloud manager 124b bound to HNI 152b, routes the packet to HNI 152b, which is coupled to virtual switch 130b. Virtual switch 130b forwards the packet to cloud manager 124b.

In some embodiments, the broadcast packet provides the VTEP IP address(es) of VTEP 138c associated with virtual router(s) 126c. The broadcast packet may include the IP address(es) of VTEP 138c for each of the one or more traffic classes associated with the one or more virtual routers 126c. The packet may also include the IP address of ESG VM 116. In some embodiments, cloud manager 124c resends the broadcast packet periodically (e.g., every 60 seconds). This helps hosts 110 in the overlay network to quickly detect the location of active ESG VM 116. In particular, each host 110 can now associate the IP address of ESG VM 116 with VTEP 138c on which ESG VM 116 is active.

In some embodiments, hosts 110 may be aware of the location of active ESG VM 116 without the use of a control tunnel and without use of the broadcast packet. A command-line interface (CLI) can be used to manually program each host 110 to map the next hop for the IP address of ESG VM 116 as the IP address(es) of VTEP 138c on new host 110c. This may be useful in case of planned maintenance as hosts 110 can be programmed with the location of active ESG VM 116 before a planned hand-off.

At block 212, operations 200 include reprogramming virtual routers on the old host with the IP addresses of the VTEP on the new host as the next hop for the ESG VM. For example, cloud manager 124b reprograms the route entries for the IP address of ESG VM 116 in the route tables at virtual routers 126b with the next hop as the IP address(es) of VTEP 138c associated with virtual router(s) 126c based on the information received in the broadcast packet. In some embodiments, both the public and private addresses of ESG VM 116 are reprogrammed. For example, cloud manager 124*b* reprograms the route tables of virtual router(s) 126*b* with VTEP 138*c* as the next hop address for a public network address of ESG VM 116 and for a private address of VTEP 118 of ESG VM 116. Cloud manager 124*b* programs virtual router(s) 126*b* not to drop packets received from the underlay that are directed to ESG VM 116 but, instead, to redirect the packets to new host 110*c*.

Cloud manager 124*c* on new host 110*c* reprograms virtual router(s) 126*c* to expect the packets from old host 110*b*.

Thus, when ESG VM 116 moves to new host 110*c*, old host 110*b* can forward traffic received on HNI 152*b* bound to ESG VM 116 to the correct host, new host 110*c*, thereby providing seamless hand-off of data traffic and preventing data traffic downtime.

Figure 3:
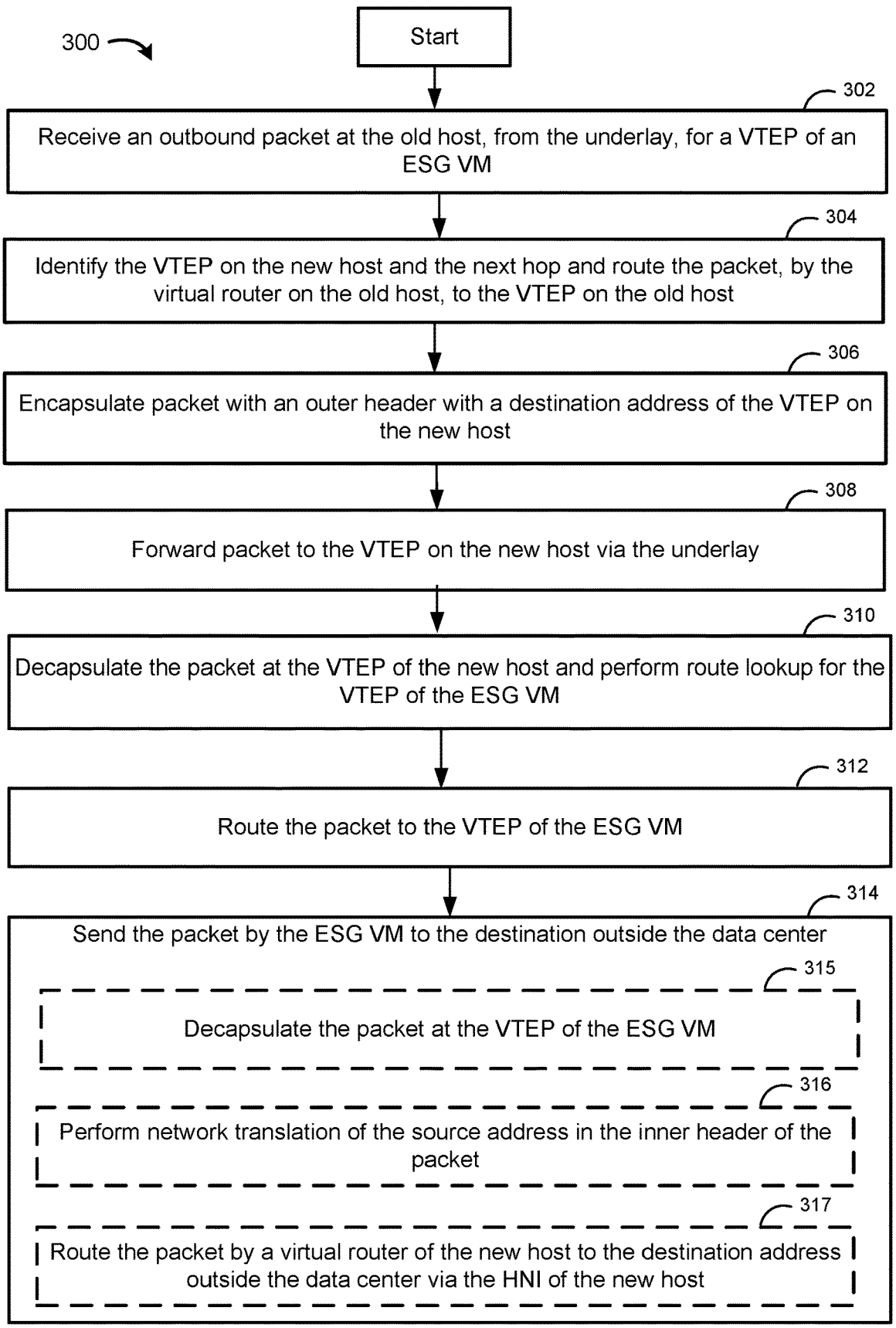
FIG. 3 depicts a flowchart of example operations for seamless hand-off of data traffic in a public cloud environment for outbound traffic, according to one or more embodiments.

FIG. 3 depicts a flowchart of example operations 300 for seamless hand-off of data traffic in a public cloud environment, according to one or more embodiments. FIG. 3 may be understood with reference to FIG. 1A. Operations 300 may provide for tunneling data packets for the ESG that are received from the underlay on the old host to the new host.

At block 302, operations 300 include receiving an outbound packet at the old host, from the underlay, for the ESG VM's VTEP. For example, the underlay continues to send packets for VTEP 118 of ESG VM 116 to HNI 152*b* of old host 110*b* while the underlay is still being reprogrammed and converging on new host 110*c*.

In an example, an outbound packet originates from VM 112*a* on source host 110*a*. The outbound packet is destined outside data center 102, such as to a destination on the Internet. Thus, the outbound packet has a source address of VM 112*a* and an Internet destination address. VM 112*a* sends the packet to virtual switch 130*a*. Virtual switch 130*a* forwards the packet to VTEP 138*a* based on the packet having a destination address outside of the data center 102. VTEP 138*a* encapsulates the packet a first time with a source address of VTEP 138*a* and a destination address of VTEP 118 (e.g., a private address for ESG VM 116). VTEP 138*a* sends the packet to virtual switch 130*a*. Virtual switch 130*a* sends the packet to the underlay via HNI 152*a* based on the destination address being outside of source host 110*a*. Because the underlay has not converged on new host 110*c*, underlay route table 157 still maps the VTEP 118 IP address to old host 110*b* HNI 152*b* as the next hop. Thus, the underlay forwards the packet to old host 110*b* via HNI 152*b*.

At block 304, operations 300 include identifying the VTEP on the new host as the next hop and routing the packet by the virtual router on the old host to the VTEP on the old host. Because the route table of virtual router 126*b* is programmed with the next-hop for VTEP 118 as the IP address of VTEP 138*c* associated with virtual router 126*c* (e.g., at block 212 above), virtual router 126*b* redirects the packet to the correct virtual router 126*c* on new host 110*c*. Virtual router 126*b* routes the packet to VTEP 138*b*, via virtual switch 130*b*.

At block 306, operations 300 include encapsulating the packet with an outer header with a destination address of the VTEP on the new host. For example, VTEP 138*b* further encapsulates the packet a second time with the address of VTEP 138*c* as the destination address and the address of VTEP 138*b* as the source address.

At block 308, operations 300 include forwarding the packet to the VTEP on the new host via the underlay. For example, VTEP 138*b* sends the packet to virtual switch 130*b*. Virtual switch 130*b* forwards the packet to the underlay via HNI 152*b* based on the destination address being outside of old host 110*b*. Although underlay 156 has not converged, underlay route table 157 is programmed with HNI 152*c* as the next hop for the address of VTEP 138*c* because the data tunnel was pre-created. Thus, the underlay, associating the IP address of VTEP 138*c* with HNI 152*c*, routes the packet to HNI 152*c*.

At block 310, operations 300 include decapsulating the packet at the VTEP of the new host and performing route lookup for the VTEP of the ESG VM. VTEP 138*c* decapsulates the second encapsulation of the packet, such that the packet is still encapsulated with the source address of VTEP 138*a* and the destination address of VTEP 118 and performs a route lookup for the IP address of the destination VTEP 118.

At block 312, operations 300 include routing the packet to the VTEP of the ESG VM. For example, virtual router 126*c* forwards the packet, via virtual switch 130*c*, to VTEP 118 of ESG VM 116 as the next hop.

At block 314, operations 300 include forwarding the packet by the ESG VM to the intended destination outside the data center. For example, at block 315, the packet is decapsulated by the VTEP of the ESG VM. VTEP 118 decapsulates the packet, such that the packet has the source address of VM 112*a* and the Internet destination address. At block 316, the ESG VM performs network translation of the source address in the inner header of the packet. ESG VM 116 translates the source address of VM 112*a* to a public network address and sends the packet to virtual router 126*c* with the public network source address and the destination Internet address. At block 317, the virtual router on the new host routes the packet to the destination address outside the data center via the HNI of the new host. Virtual router 126*c* routes the packet to network 158 via HNI 152*c*.

Figure 4:
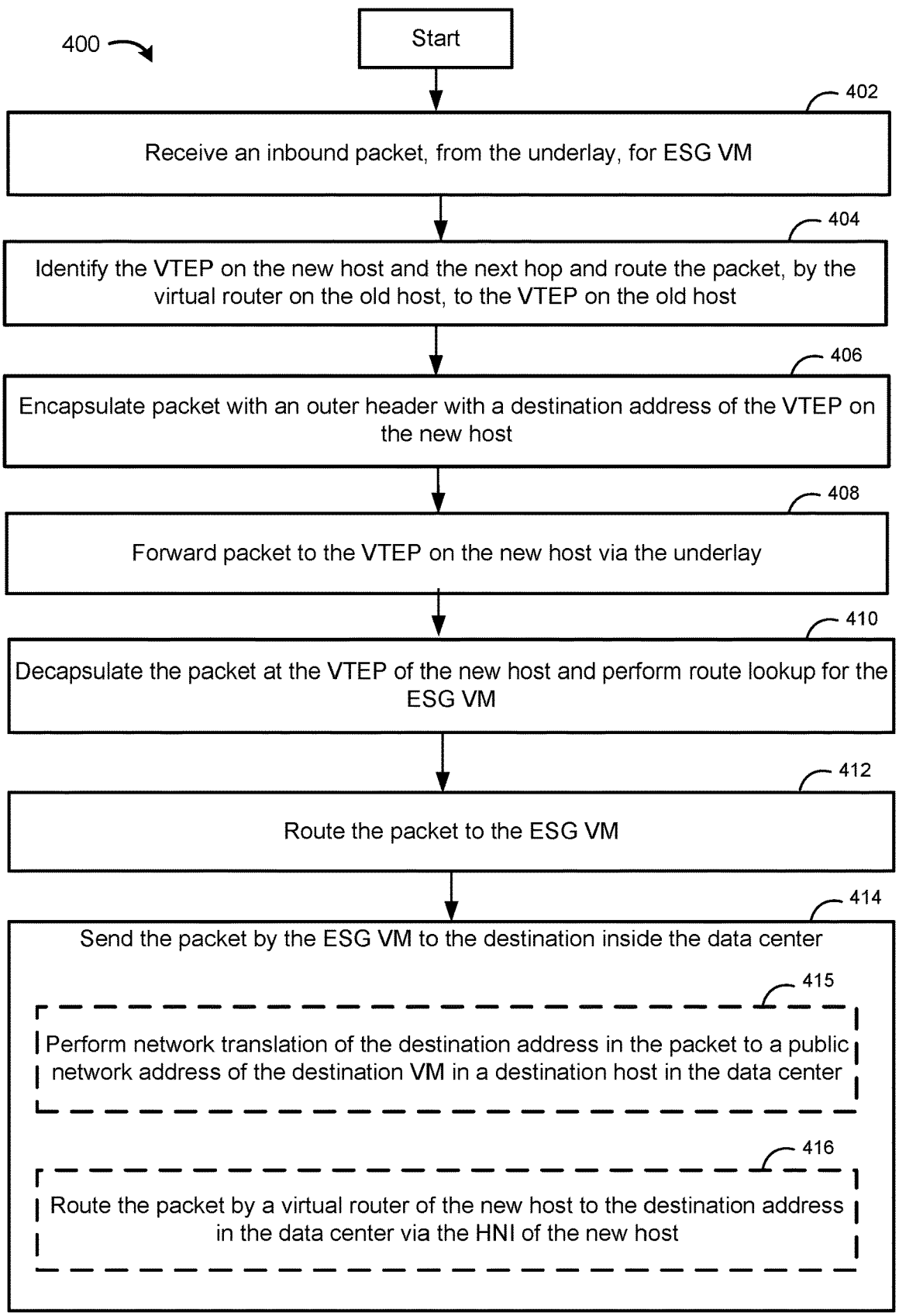
FIG. 4 depicts a flowchart of example operations for seamless hand-off of data traffic in a public cloud environment for inbound traffic, according to one or more embodiments.

FIG. 4 depicts a flowchart of example operations 400 for seamless hand-off of data traffic in a public cloud environment for inbound traffic, according to one or more embodiments.

At block 402, operations 400 include receiving an inbound packet at the old host, from the underlay, for the ESG VM. For inbound traffic, while the underlay still has not converged, the underlay forwards traffic from network 158, to a public network address associated with ESG VM 116, to HNI 152*b* of old host 110*b* as the next hop for the public network address associated with ESG VM 116.

At block 404, operations 400 include identifying the VTEP on the new host as the next hop and routing the packet by the virtual router on the old host to the VTEP on the old host. Virtual router 126*b* is programmed with VTEP 138*c* as the next hop for the public network address associated with ESG VM 116. Thus, the packet is routed to VTEP 138*b*.

At block 406, operations 400 include encapsulating the packet with an outer header with a destination address of the VTEP on the new host. VTEP 138*b* encapsulates the packet a first time with the address of VTEP 138*c* as the destination address and the address of VTEP 138*b* as the source address.

At block 408, operations 400 include forwarding the packet to the VTEP on the new host via the underlay. Although the underlay has not converged, underlay route table 157 is programmed with HNI 152*c* as the next hop for the address of VTEP 138*c*.

At block 410, operations 400 include decapsulating the packet at the VTEP of the new host and performing route lookup for the ESG VM. VTEP 138*c* decapsulates the packet and performs a route lookup for the destination address the public network address associated with ESG VM 116.

At block 412, operations 400 include routing the packet to the ESG VM. For example, virtual router 126*c* forwards the packet, via virtual switch 130*c*, to ESG VM 116 as the next hop based on the packet including as a destination address the public network address associated with ESG VM 116.

At block 414, operations 400 include forwarding the packet by the ESG VM to the intended destination inside the data center. At block 415, the ESG VM performs network translation of the destination address to a destination address of the destination VM on a destination host in the data center. ESG VM 116 translates the destination address and sends the packet to virtual router 126*c*. At block 416, the virtual router on the new host routes the packet to the destination address in the data center via the HNI of the new host. Virtual router 126*c* routes the packet to the address of VTEP 138*a* as the next hop address for the destination address of VM 112*a* and, therefore, sends the packet to VTEP 138*c* to encapsulate the packet with source address of VTEP 138*c* and destination address of VTEP 138*a*. The packet is routed to the underlay, which routes the packet to VTEP 138*a* via HNI 152*a*. VTEP 138*a* decapsulates the packet and sends the packet to the destination VM 112*a*.

The embodiments described herein provide a technical solution to a technical problem associated with data traffic downtime due to hand-off of data traffic, such as downtime due to underlay programming and convergence when an active ESG VM 116 moves to a new host 110*c* or a standby ESG VM 116 is activated on new host 110*c*. More specifically, implementing the embodiments herein allows for creating tunnels to forward traffic to new host 110*c* even when the underlay sends traffic to old host 110*a* before the underlay converges on new host 110*c*. In some embodiments, data traffic downtime due to the data traffic hand-off can be reduced to less than one second.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities— usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of activating an edge services gateway (ESG) virtual computing instance (VCI) on a new host, the method comprising:
  prior to activating the ESG VCI on the new host, programming a routing table of an underlay network to associate a first IP address of a first tunnel endpoint with a first network interface and to associate a second IP address of a second tunnel endpoint with a second network interface, wherein the first network interface is associated with an old host and the second network interface is associated with the new host, and wherein the routing table associates a third IP address of the ESG VCI with the first network interface; and
  after activating the ESG VCI on the new host:
    initiating reprogramming of the routing table to associate the third IP address with the second network interface instead of the first network interface;
    after initiating the reprogramming, receiving, at the first network interface, a packet having as a destination address the third IP address;
    encapsulating, by the first tunnel endpoint, the packet with an outer header having as a destination address the second IP address;
    transmitting, via the underlay network, the encapsulated packet to the second tunnel endpoint, wherein the underlay network routes the encapsulated packet from the first network interface to the second network interface based on the routing table associating the second IP address with the second network interface;
    decapsulating, by the second tunnel endpoint, the encapsulated packet; and
    forwarding the packet on the new host to the ESG VCI.

2. The method of claim 1, further comprising, after activating the ESG VCI on the new host, and prior to receiving, at the first network interface, the packet:
  programming a first routing table of a first virtual router running on the old host to route packets having as a destination IP address the third IP address to the second IP address; and
  programming a second routing table of a second virtual router running on the new host to route packets having as a destination IP address the third IP address to the ESG VCI.

3. The method of claim 2, further comprising, after the routing table is reprogrammed:
  reprogramming the first routing table to no longer route packets having as a destination IP address the third IP address to the second IP address.

4. The method of claim 1, further comprising:
  prior to activating the ESG VCI on the new host, establishing a control tunnel between the old host and the new host; and
  after activating the ESG VCI on the new host, transmitting a second packet from the old host to the new host over the control tunnel, the second packet associating the third IP address with the first IP address.

5. The method of claim 4, wherein establishing the control tunnel between the old host and the new host comprises programming a route table in the underlay network to associate an address of a first local process running on the old host with the first network interface and to associate an address of a second local process running on the new host with the second network interface.

6. The method of claim 1, further comprising, after the routing table is reprogrammed:
  receiving, via the underlay network, a second packet at the second network interface, the second packet having as a destination address the third IP address; and
  forwarding the second packet on the new host to the ESG VCI.

7. The method of claim 1, wherein the third IP address of the ESG VCI stays the same prior to and after activating the ESG VCI on the new host.

8. A non-transitory computer readable medium comprising instructions that, when executed by one or more processors of a computing system, cause the computing system to perform a method for activating an edge services gateway (ESG) virtual computing instance (VCI) on a new host, the method comprising:
  prior to activating the ESG VCI on the new host, programming a routing table of an underlay network to associate a first IP address of a first tunnel endpoint with a first network interface and to associate a second IP address of a second tunnel endpoint with a second network interface, wherein the first network interface is associated with an old host and the second network interface is associated with the new host, and wherein the routing table associates a third IP address of the ESG VCI with the first network interface; and
  after activating the ESG VCI on the new host:
    initiating reprogramming of the routing table to associate the third IP address with the second network interface instead of the first network interface;
    after initiating the reprogramming, receiving, at the first network interface, a packet having as a destination address the third IP address;
    encapsulating, by the first tunnel endpoint, the packet with an outer header having as a destination address the second IP address;
    transmitting, via the underlay network, the encapsulated packet to the second tunnel endpoint, wherein the underlay network routes the encapsulated packet from the first network interface to the second network interface based on the routing table associating the second IP address with the second network interface;
    decapsulating, by the second tunnel endpoint, the encapsulated packet; and
    forwarding the packet on the new host to the ESG VCI.

9. The non-transitory computer readable medium of claim 8, wherein the method further comprises, after activating the ESG VCI on the new host, and prior to receiving, at the first network interface, the packet:

programming a first routing table of a first virtual router running on the old host to route packets having as a destination IP address the third IP address to the second IP address; and programming a second routing table of a second virtual router running on the new host to route packets having as a destination IP address the third IP address to the ESG VCI.

10. The non-transitory computer readable medium of claim 9, wherein the method further comprises, after the routing table is reprogrammed:

reprogramming the first routing table to no longer route packets having as a destination IP address the third IP address to the second IP address.

11. The non-transitory computer readable medium of claim 8, wherein the method further comprises:

prior to activating the ESG VCI on the new host, establishing a control tunnel between the old host and the new host; and after activating the ESG VCI on the new host, transmitting a second packet from the old host to the new host over the control tunnel, the second packet associating the third IP address with the first IP address.

12. The non-transitory computer readable medium of claim 11, wherein establishing the control tunnel between the old host and the new host comprises programming a route table in the underlay network to associate an address of a first local process running on the old host with the first network interface and to associate an address of a second local process running on the new host with the second network interface.

13. The non-transitory computer readable medium of claim 8, wherein the method further comprises, after the routing table is reprogrammed:

receiving, via the underlay network, a second packet at the second network interface, the second packet having as a destination address the third IP address; and forwarding the second packet on the new host to the ESG VCI.

14. The non-transitory computer readable medium of claim 8, wherein the third IP address of the ESG VCI stays the same prior to and after activating the ESG VCI on the new host.

15. A system comprising one or more processors and a non-transitory computer readable medium, wherein the non-transitory computer readable medium comprises instructions that, when executed by the one or more processors, cause the system to perform a method for activating an edge services gateway (ESG) virtual computing instance (VCI) on a new host, the method comprising:

prior to activating the ESG VCI on the new host, programming a routing table of an underlay network to associate a first IP address of a first tunnel endpoint with a first network interface and to associate a second IP address of a second tunnel endpoint with a second network interface, wherein the first network interface is associated with an old host and the second network interface is associated with the new host, and wherein the routing table associates a third IP address of the ESG VCI with the first network interface; and after activating the ESG VCI on the new host:

initiating reprogramming of the routing table to associate the third IP address with the second network interface instead of the first network interface;

after initiating the reprogramming, receiving, at the first network interface, a packet having as a destination address the third IP address;

encapsulating, by the first tunnel endpoint, the packet with an outer header having as a destination address the second IP address;

transmitting, via the underlay network, the encapsulated packet to the second tunnel endpoint, wherein the underlay network routes the encapsulated packet from the first network interface to the second network interface based on the routing table associating the second IP address with the second network interface;

decapsulating, by the second tunnel endpoint, the encapsulated packet; and forwarding the packet on the new host to the ESG VCI.

16. The system of claim 15, wherein the method further comprises, after activating the ESG VCI on the new host, and prior to receiving, at the first network interface, the packet:

programming a first routing table of a first virtual router running on the old host to route packets having as a destination IP address the third IP address to the second IP address; and programming a second routing table of a second virtual router running on the new host to route packets having as a destination IP address the third IP address to the ESG VCI.

17. The system of claim 16, wherein the method further comprises, after the routing table is reprogrammed:

reprogramming the first routing table to no longer route packets having as a destination IP address the third IP address to the second IP address.

18. The system of claim 15, wherein the method further comprises:

prior to activating the ESG VCI on the new host, establishing a control tunnel between the old host and the new host; and after activating the ESG VCI on the new host, transmitting a second packet from the old host to the new host over the control tunnel, the second packet associating the third IP address with the first IP address.

19. The system of claim 18, wherein establishing the control tunnel between the old host and the new host comprises programming a route table in the underlay network to associate an address of a first local process running on the old host with the first network interface and to associate an address of a second local process running on the new host with the second network interface.

20. The system of claim 15, wherein the method further comprises, after the routing table is reprogrammed:

receiving, via the underlay network, a second packet at the second network interface, the second packet having as a destination address the third IP address; and forwarding the second packet on the new host to the ESG VCI.

* * * * *